A. J. ROBERTS & W. C. WRIGHT, Sr.
TRACTION ENGINE.
APPLICATION FILED JAN. 15, 1915.
1,193,616.
Patented Aug. 8, 1916.
2 SHEETS—SHEET 1.
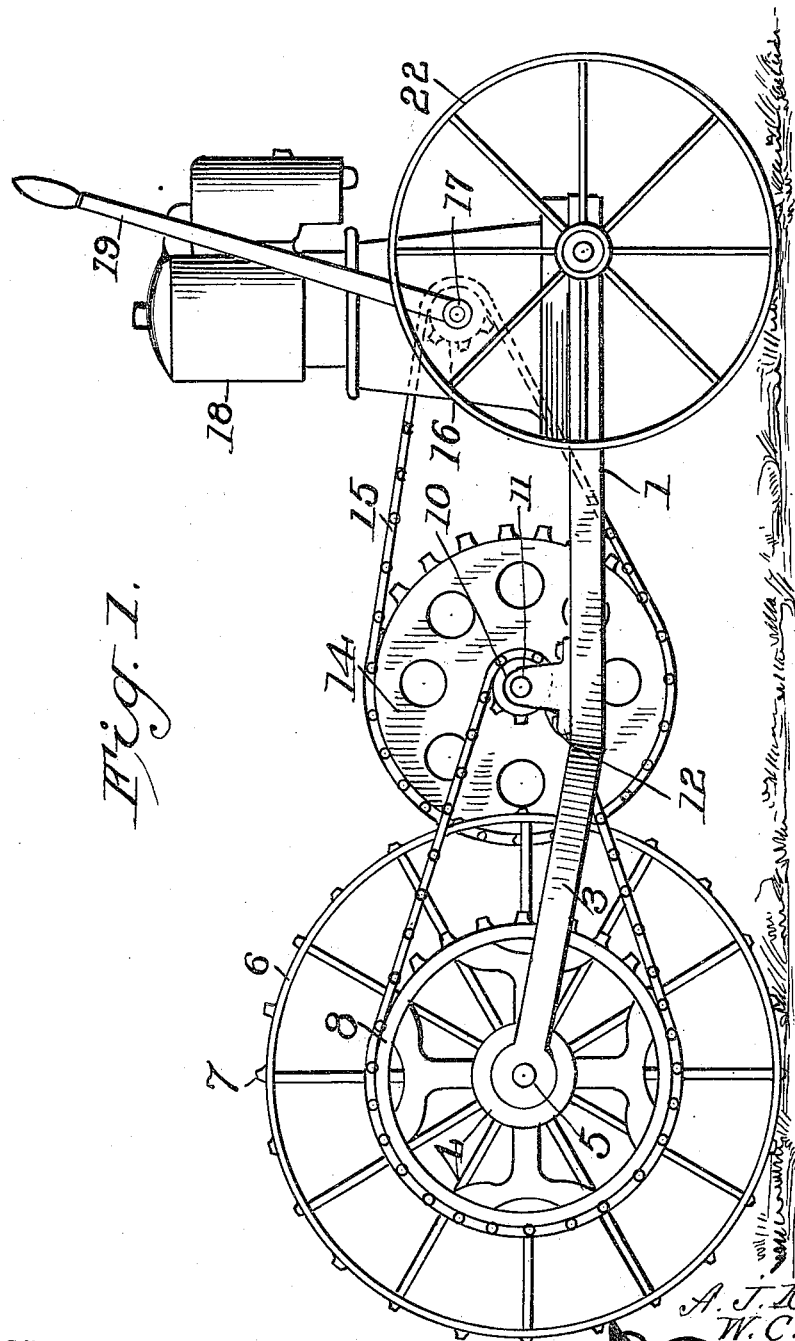

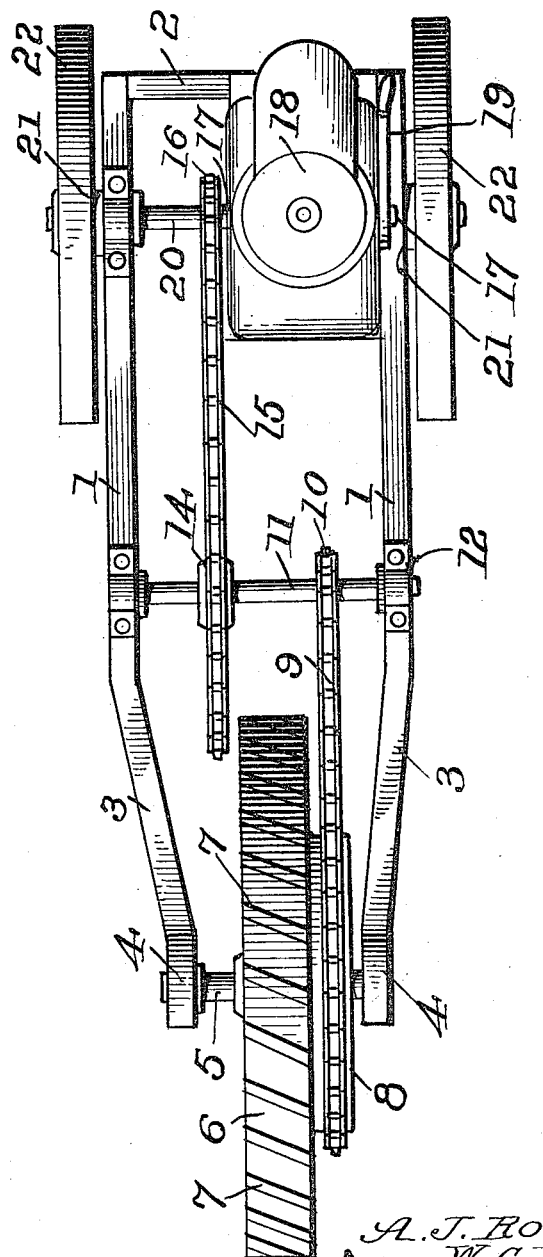

UNITED STATES PATENT OFFICE.

ADRIAN J. ROBERTS, OF FLOYDADA, AND WAYNE C. WRIGHT, SR., OF PLAINVIEW, TEXAS.

TRACTION-ENGINE.

1,193,616. Specification of Letters Patent. Patented Aug. 8, 1916.

Application filed January 15, 1915. Serial No. 2,394.

*To all whom it may concern:*

Be it known that we, (1) ADRIAN J. ROBERTS and (2) WAYNE C. WRIGHT, Sr., citizens of the United States, residing at (1) Floydada and (2) Plainview, in the counties of (1) Floyd and (2) Hale, State of Texas, have invented certain new and useful Improvements in Traction-Engines; and we do hereby declare the following to be a full, clear, and exact description of the invention, such has will enable others skilled in the art to which it appertains to make and use the same.

This invention relates to traction engines, for various uses about a farm, and one of the principal objects of the invention is to simplify the construction of engines of this character, to render them much lighter in weight, and easy to manage, said engine being propelled by means of a two-cycle engine which will permit a reversal of the engine, thus dispensing with the ordinary transmission gear and differential gear.

The ordinary traction engines in general use are exceedingly heavy, and are more or less complicated owing to the differential gearing which is liable to get out of order and owing to the fact that usually four-cycle engines are used which render it impossible to reverse the engine for backing or reverse propulsion of the machine.

The principal object of the invention is to simplify the construction, reduce the weight, provide a traction engine which can be produced at a comparatively low cost and one which can be readily managed by a person not particularly well skilled in mechanics.

The foregoing and other objects may be attained by means of the construction illustrated in the accompanying drawing, in which—

Figure 1 is a side elevation of a traction engine made in accordance with this invention, and Fig. 2 is a top plan view of the same.

Referring to the drawings, the numeral 1 designates the side bars of the engine and 2 is the front cross bar. The side bars 1 are inclined at their rear ends as shown at 3 and said bars are also slightly converging at their rear ends, as shown in Fig. 2. The rear ends of the upwardly inclined portion 3 of the frame are provided with bearings 4 for the rear axle 5. Rigidly mounted on the rear axle 5 is a traction wheel 6 provided with suitable bearing lugs 7, and connected to one side of the traction wheels 6 is a sprocket wheel 8 around which a chain 9 passes, said chain extending around a small sprocket wheel 10 on a counter shaft 11. The counter shaft is mounted in brackets 12 supported upon the side bars 1 of the frame. Rigidly connected to the counter shaft 11 is a large sprocket wheel 14 and a drive chain 15 passes around the sprocket wheel 14 and around a small sprocket wheel 16 mounted on the motor shaft 17. The motor 18 is of the two-cycle type, and a lever 19 is connected to the motor shaft 17 for reversing the engine when it is desired to start the same.

The front axle 20 is mounted in suitable bearings 21 on the bars 1 and is provided with ground wheels 22.

A traction engine made in accordance with this invention is extremely simple in construction, cannot readily get out of order, can be reversed, dispenses entirely with a differential gear and is extremely light in weight and easily managed.

Various changes in details of construction may be resorted to without departing from the spirit and scope of the invention as defined in the claim.

The relative dimensions of the sprocket wheels insure power and speed to the machine, and whenever desired the sprocket wheel 14 may be enlarged or reduced in size in accordance with conditions required.

What is claimed is:—

A traction engine comprising a frame having spaced side bars converging toward their rear ends, a front bar connected to the forward ends of said side bars, an axle journaled transversely across the rear converging ends of said side bars, a tractor wheel mounted on said axle and located between the side bars, a sprocket wheel secured on said axle and one side of said tractor wheel, a pair of bearing brackets secured on the side bars centrally thereof, a stub shaft journaled in said brackets, a pair of sprocket wheels journaled on said shaft at spaced distances apart, means connecting one of the sprocket wheels of the central shaft with the sprocket wheel on the tractor wheel shaft, an axle journaled in said side bars adjacent the forward ends thereof, a pair of ground wheels secured on the opposite end of said axle and disposed on the outer side of said bars, a motor positioned in the forward end of the frame and disposed above the axle, a sprocket wheel carried on the motor shaft, and being in direct alinement with one of the sprocket wheels of the central shaft, means connecting the sprocket wheels of the central shaft with the sprocket wheels of the motor shaft for rotating said central shaft and in turn rotating the tractor wheel.

In testimony whereof we affix our signatures in presence of two witnesses.

ADRIAN J. ROBERTS.
WAYNE C. WRIGHT, Sr.

Witnesses:
 Guy Jacob,
 J. G. Dougherty.

Copies of this patent may be obtained for five cents each, by addressing the "Commissioner of Patents, Washington, D. C."